J. T. HAMILTON.
COTTON CHOPPER.
APPLICATION FILED APR. 9, 1908.
902,075.
Patented Oct. 27, 1908.
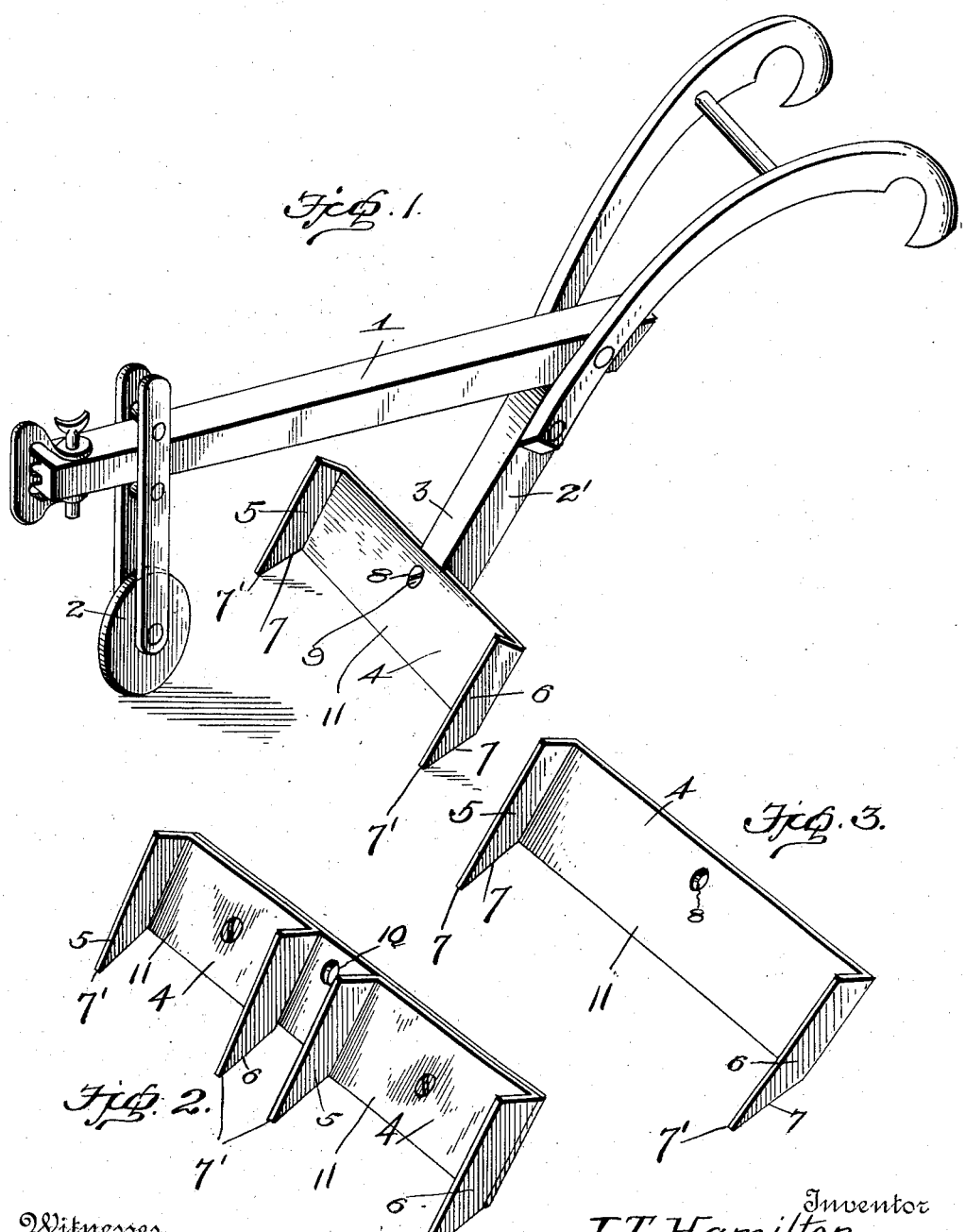
Witnesses
C. E. Hunt
C. H. Griesbauer
Inventor
J. T. Hamilton
By H. B. Willson & Co.
Attorneys

UNITED STATES PATENT OFFICE.

JAMES T. HAMILTON, OF ALBERTSON, MISSISSIPPI.

COTTON-CHOPPER.

No. 902,075.　　　　Specification of Letters Patent.　　　Patented Oct. 27, 1908.

Application filed April 9, 1908. Serial No. 426,102.

*To all whom it may concern:*

Be it known that I, JAMES T. HAMILTON, a citizen of the United States, residing at Albertson, in the county of Jones and State of Mississippi, have invented certain new and useful Improvements in Cotton-Choppers; and I do declare the following to be a full, clear, and exact description of the invention, such as will enable others skilled in the art to which it appertains to make and use the same.

This invention relates to an improved cotton chopping blade or scraper.

The object of the invention is to provide a cotton chopping blade designed to be removably attached to an ordinary plow or cultivator standard or stock.

With this and other objects in view, the invention consists of certain novel features of construction, combination and arrangement of parts as will be more fully described and particularly pointed out in the appended claims.

In the accompanying drawings, Figure 1 is a perspective view of a plow provided with one form of this improved chopping attachment; Fig. 2 is a perspective view of one of the interchangeable blades detached and showing two short blades arranged on a connecting bar; and Fig. 3 is a similar view of a long blade.

In the embodiment illustrated a plow frame of ordinary construction is shown; the beam 1 having a wheel 2' mounted at the front end thereof and the standard 2 has a shoulder 3 formed on its front edge near its lower end to form a stop for limiting the upward movement of the chopping blade 4. This blade 4 is made as shown of any suitable material with its opposite ends bent at right angles to form flanges 5 and 6 to form a dirt guard for the plants. These flanges 5 and 6 project at one end beyond the edge of the body of the blade and have their lower edges beveled at 7 to form points for entering and cultivating the ground. An aperture 8 is formed preferably near the upper edge intermediately of the ends of the blade 4 through which a screw 9 or other suitable fastening means is designed to be passed for securing the blade to the standard or stock 2.

Blades of varying lengths are preferably provided, those to be used the first time for chopping out or thinning are preferably made about twelve inches in length and are secured two inches apart to a bar of iron 10 and when these spaced blades pass over the cotton rows plants are left standing twelve inches apart and these blades may be used as soon as the plants come through the ground and before the side harrow or any other implement has been used. When the cotton needs hoeing the second time the bar 10 carrying the spaced blades or scrapers is removed and a twenty-two inch scraper is substituted therefor. The passage of this long scraper across the cotton rows cuts out the grass and weeds and every other hill of cotton. Hence by substituting one set of blades for the other a single plow may be used to accomplish the two operations of thinning and hoeing. After the passage of the long blade across the rows all grass and weeds are removed with the exception of about two inches for every two feet, leaving only this small space to be hoed by hand. These plates are mounted on the standard 2' in an inclined or oblique position, as shown in Fig. 1 with the pointed ends 7' of the flanges 5 and 6 disposed on the lower edge, and which are designed to enter the ground before the cutting edges 11 come into action. These points penetrate the ground and loosen up the earth adjacent the plants, and hence the blades perform a double function of a cultivator and scraper. These blades are preferably secured midway their length to the standard 2' and extend laterally on opposite sides thereof to operate over the rows, while the wheel 2 travels in the water furrow.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention:—

1. In a cotton chopper, the combination with a supporting frame, of a scraper blade secured thereto at an oblique angle and having flanges at its opposite ends, said flanges projecting forwardly and having pointed projections arranged at their lower ends and constructed to penetrate the ground in advance of the scraping edge of the blade.

2. A cotton chopper comprising a beam having a depending standard, a blade secured to said standard intermediately of its ends with its lower cutting edge inclined downwardly, right angularly disposed inwardly extending flanges formed at opposite ends of said blade, said flanges extending beyond the cutting edge of said blade and having their lower ends beveled to form projecting points for engaging the ground in advance of the cutting edge of the blade.

In testimony whereof I have hereunto set my hand in presence of two subscribing witnesses.

JAMES T. HAMILTON.

Witnesses:
  E. H. WOODHAM,
  S. W. RUFFIN.